G. W. KEENE.

Heels of Boots and Shoes.

No. 5,722. Reissued Jan. 6, 1874.

WITNESSES:

Ma. M. Shepard

J. C. Simpson

INVENTOR:

Geo. W. Keene

A.M. PHOTO-LITHOGRAPHIC Co. N.Y. (OSBORNE'S PROCESS)

UNITED STATES PATENT OFFICE.

GEORGE W. KEENE, OF LYNN, ASSIGNOR TO DAVID ROBINSON, TRUSTEE OF THE KEENE HEELING-MACHINE ASSOCIATION, OF BOSTON, MASS.

IMPROVEMENT IN HEELS OF BOOTS AND SHOES.

Specification forming part of Letters Patent No. 34,037, dated December 24, 1861; reissue No. 5,722, dated January 6, 1874; application filed December 29, 1873.

DIVISION A.

*To all whom it may concern:*

Be it known that I, GEORGE W. KEENE, of Lynn, in the county of Essex and State of Massachusetts, have invented a new and Improved Heel for Boots and Shoes, of which the following is a full, clear, and exact description, reference being had to the accompanying drawings, making part of this specification, in which—

Figure 1:
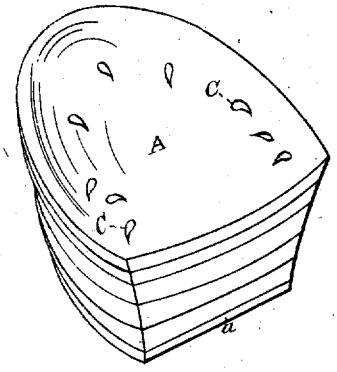
Figure 3:
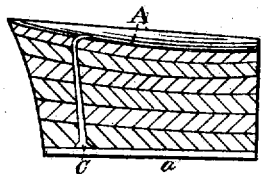
Figure 2:
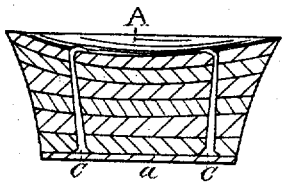

Figure 1 is a perspective view of my improved heel. Fig. 2 is a transverse section, and Fig. 3 is a longitudinal section, through the heel, showing the relative position of some of the nails, and the bottom lift which covers the heads of the nails.

To enable those skilled in the art to which my invention belongs to make and use the same, I will proceed to describe the manner in which I have carried it out.

Risers or lifts of leather are cut to near the form to be given to the heel, and are placed, in sufficient number to produce the required height, in a press adapted to receive them, by which the hollow or concave seat A for the wearer's heel is formed, and the leather is compressed, the surfaces between which the heel is compressed being of iron. A series of holes for the lift-holding nails B are now made in the heel. This may be done by suitable means at the time the heel is compressed, or by a separate operation. The nails C are then inserted or placed in the holes, and the heel is returned to the press, by the operation of which the nails are all driven through the heel, or the lifts composing the heel, and clinched above the lift which comes next to the sole of the boot or shoe; at the same time the heel-lifts receive a final compression, and the hollow or concave for the wearer's heel is completed. A thin lift, *a*, of leather may then be secured to the bottom surface of the heel to conceal the heads of the nails, and the heel is subsequently brought to the exact form and size required by paring or by cutting in a suitable machine.

The heel represented in the drawing was designed more particularly to be secured to the boot or shoe by nails driven from the inside of the boot or shoe through the sole into the heel, but it is evident that the invention is applicable to heels for boots or shoes otherwise fastened or secured to the boot or shoe.

I am aware that heels have been formed of a suitable number of risers secured together by cement or glue, which were afterward secured to the shoe or boot by nails. I do not, therefore, claim such a heel; but What I do claim as my invention, and desire to secure by Letters Patent, is—

A boot or shoe heel composed of a series of lifts or risers, secured and held permanently together by a series of nails, which are all driven from the tread-lift upward, and their points clinched at the time the heel-lifts receive a final compression.

GEORGE W. KEENE.

Witnesses:
M. W. SHEPARD,
E. C. STIMPSON.